United States Patent [19]

Sanders et al.

[11] Patent Number: 4,935,903
[45] Date of Patent: Jun. 19, 1990

[54] REINFORCEMENT OF SURFACE SEISMIC WAVEFIELDS

[75] Inventors: Joe I. Sanders, Sugar Land; Edward L. Shuck, Dallas, both of Tex.

[73] Assignee: Halliburton Geophysical Services, Inc., Houston, Tex.

[21] Appl. No.: 398,813

[22] Filed: Aug. 25, 1989

Related U.S. Application Data

[63] Continuation-in-part of Ser. No. 358,887, May 30, 1989.

[51] Int. Cl.$^5$ .............................................. G01V 1/38
[52] U.S. Cl. ........................................ 367/24; 367/21; 367/59
[58] Field of Search ............................ 367/21, 24, 59; 181/112

[56] References Cited

U.S. PATENT DOCUMENTS

| | | | |
|---|---|---|---|
| H387 | 12/1987 | Kruka et al. | 367/154 |
| Re. 23,552 | 9/1952 | Babb et al. | 177/352 |
| 1,584,613 | 5/1926 | Comstock et al. | |
| 2,627,930 | 2/1953 | Woods | 181/5 |
| 2,740,945 | 4/1956 | Howes | 340/15 |
| 2,753,948 | 7/1956 | Ongaro | 181/33 |
| 2,757,356 | 7/1956 | Haggerty | 340/7 |
| 2,791,757 | 5/1957 | Blake et al. | 340/7 |
| 2,807,793 | 9/1957 | Bavhi | 340/17 |
| 2,856,594 | 10/1958 | McLoad | 340/17 |
| 2,906,992 | 9/1959 | Wilcoxon | 340/8 |
| 3,054,085 | 9/1962 | Alexander | 340/17 |
| 3,274,542 | 9/1966 | Ruehle | 350/15 |
| 3,286,227 | 11/1966 | Aldrich | 340/13 |
| 3,304,364 | 2/1967 | Hetherington | 174/101 |
| 3,319,734 | 5/1967 | Pavey, Jr. | 181/0.5 |
| 3,343,626 | 9/1967 | Sparks | 181/0.5 |
| 3,350,683 | 10/1967 | Sengbush | 340/7 |
| 3,354,860 | 11/1967 | Dale et al. | 114/235 |
| 3,354,984 | 11/1967 | Pavey, Jr. | 181/0.5 |
| 3,369,216 | 2/1968 | Loper | 340/7 |
| 3,371,311 | 2/1968 | Cholet et al. | 340/17 |
| 3,441,902 | 4/1969 | Savit | 340/7 |
| 3,491,848 | 1/1970 | Giles | 181/0 |
| 3,518,677 | 6/1970 | Florian | 340/7 |
| 3,696,329 | 10/1972 | Hazelhurst | 340/7 |
| 3,710,006 | 1/1973 | Davis | 174/101 |
| 3,739,328 | 6/1973 | Beil | 340/15 |
| 3,860,899 | 1/1975 | Watlington | 340/3 |
| 3,863,201 | 1/1975 | Briggs et al. | 340/15 |
| 3,893,065 | 7/1975 | Lea et al. | 340/8 |
| 3,930,254 | 12/1975 | Pavey, Jr. | 340/7 |
| 3,932,835 | 1/1976 | Abbott | 340/7 |
| 3,943,484 | 3/1976 | Balderson | 367/24 |
| 3,964,424 | 6/1976 | Hagemann | 114/235 |
| 3,990,039 | 11/1976 | Miller | 340/17 |
| 4,038,630 | 7/1977 | Chelminski | 340/7 |
| 4,078,223 | 3/1978 | Strange | 340/7 |
| 4,090,168 | 5/1978 | Miller et al. | 340/3 |
| 4,117,447 | 9/1978 | Gould et al. | 340/4 |

(List continued on next page.)

FOREIGN PATENT DOCUMENTS

| | | |
|---|---|---|
| 1316479 | 11/1970 | United Kingdom . |
| 2004648 | 4/1979 | United Kingdom . |
| 2030400 | 4/1980 | United Kingdom . |

OTHER PUBLICATIONS

Gal'perin, "Vertical Seismic Profiling," published by Society of Exploration Geophysicists, Pubn. No. 12, pp. 96–99.

(List continued on next page.)

*Primary Examiner*—Thomas H. Tarcza
*Assistant Examiner*—Ian J. Lobo
*Attorney, Agent, or Firm*—Thomas R. Weaver; David J. Powsner

[57] ABSTRACT

A marine seismic reflection prospecting system attenuates coherent noise through reinforcement of primary reflection data by the addition of corrected ghost reflection data. The system includes a seismic energy source, a detector, a wavefield separator, a time-shift element, and an element for generating an output signal representative of an additive linear combination of time-aligned primary and ghost signal components. The system's output is suitable for further pre-stack processing, e.g., NMO correction.

20 Claims, 6 Drawing Sheets

U.S. PATENT DOCUMENTS

| | | | |
|---|---|---|---|
| 4,146,871 | 3/1979 | Ruehle | 340/7 |
| 4,160,229 | 7/1979 | McGough | 340/7 |
| 4,210,897 | 7/1980 | Hutchins | 367/106 |
| 4,276,620 | 6/1981 | Kahn et al. | 367/60 |
| 4,296,481 | 10/1981 | Weiss | 367/20 |
| 4,317,185 | 2/1982 | Thigpen et al. | 367/15 |
| 4,345,473 | 8/1982 | Berni | 73/516 |
| 4,348,749 | 9/1982 | Galbraith, Jr. | 367/46 |
| 4,353,121 | 10/1982 | Rey et al. | 367/21 |
| 4,380,059 | 4/1983 | Ruehle | 367/46 |
| 4,402,069 | 8/1983 | Miller et al. | 367/154 |
| 4,415,997 | 11/1983 | Wilson | 367/15 |
| 4,437,175 | 3/1984 | Berni | 367/24 |
| 4,439,497 | 3/1984 | DiFoggio | 428/539 |
| 4,449,208 | 5/1984 | Moeckel et al. | 367/30 |
| 4,477,887 | 10/1984 | Berni | 367/20 |
| 4,486,865 | 12/1984 | Ruehle | 367/24 |
| 4,510,588 | 4/1985 | Kruka et al. | 367/165 |
| 4,520,467 | 5/1985 | Berni | 367/24 |
| 4,581,724 | 4/1986 | Zachariadis | 367/21 |
| 4,633,449 | 12/1986 | Ingram et al. | 367/75 |
| 4,644,507 | 2/1987 | Ziolkowski | 367/23 |
| 4,644,508 | 2/1987 | Zachariadis | 367/24 |
| 4,660,183 | 4/1987 | McGowan et al. | 367/15 |
| 4,679,179 | 7/1987 | Lally | 367/162 |
| 4,685,090 | 8/1987 | Krevor | 367/20 |
| 4,733,378 | 3/1988 | Pearce et al. | 367/17 |
| 4,733,379 | 3/1988 | Lapentina et al. | 367/20 |
| 4,734,891 | 3/1988 | McGowan et al. | 367/15 |
| 4,736,345 | 4/1988 | Keckler et al. | 367/20 |
| 4,752,916 | 6/1988 | Loewenthal | 367/24 |
| 4,765,436 | 8/1988 | Dowell | 181/207 |
| 4,809,243 | 2/1989 | Bledsoe et al. | 367/154 |
| 4,813,028 | 3/1989 | Liu | 367/31 |
| 4,821,241 | 4/1989 | Berglund | 367/20 |
| 4,837,751 | 6/1989 | Kruka et al. | 367/154 |

OTHER PUBLICATIONS

Treitel et al, "Plane-wave Decomposition of Seismograms," Geophysics, vol. 47, No. 10, Oct. 1982, pp. 1375-1401.

White, "Chapter 2-Plane Waves," Seismic Wave Radiation-Transmission and Attenuation, McGraw Hill, 1965, pp. 15-41.

Ziolkowski et al, "Wavelet Deconvolution Using a Source Scaling Law," Geophysical Prospecting, vol. 28, 1980, pp. 872-901.

Cagniard, "Basic Theory of the Magneto-Telluric Method of Geophysical Prospecting," pp. 605-635.

Ziolkowski, "Source Array Scaling for Wavelet Deconvolution," Geophysical Prospecting, vol. 28, 1980, pp. 902-918.

Loewenthal, "Patents," Geophysics, vol. 53, Dec. 1988, p. 1627.

Loewenthal et al, "Source Signature Estimation Using Fictitious Source and Reflector," Geophysics, vol. 54, No. 7, Jul. 1989, pp. 916-920.

Monk, "Wavefield Separation of Twin Streamer Data," presented at 51st Ann. Mtg of the European Assn of Exploration Geophysicists, Jun. 1989.

Dobrin et al, Introduction to Geophysical Propsecting, McGraw-Hill, 1988.

Telford et al, Applied Geophysics, Cambridge University Press, 1976.

REINFORCEMENT OF SURFACE SEISMIC WAVEFIELDS

REFERENCE TO RELATED APPLICATIONS

This application is a continuation in part of U.S. patent application Ser. No. 07/358,887, filed May 30, 1989, and assigned to the assignee hereof.

BACKGROUND OF THE INVENTION

This invention relates to marine seismic surveying and, more particularly, to methods and apparatus for enhancing marine seismic profiles to minimize destructive effects of coherent noise, e.g., that caused by water column reverberation, or "ghosting."

Generally speaking, marine seismic surveys are conducted by towing an energy source and seismic detector behind a vessel. The source imparts an acoustic wave to the water, creating a wavefield which travels coherently into the underlying earth. As the wavefield strikes interfaces between earth formations, or strata, it is reflected back through the earth and water to the detectors, where it is converted to an electrical signal and recorded. Through analysis of this signal, it is possible to determine the shape, position and make-up of sub-bottom formations.

A problem encountered in marine surveying—as well as in its land counterpart, vertical seismic profiling, or "VSP"—is that of water column reverberation. The problem which arises as a result of inherent reflectivity of the water surface and bottom may be explained as follows.

A seismic wave generated in (or reflected off) earth strata passes into the water in a generally upward direction. This wave, termed the "primary," travels through the water and by the seismic detector, which records the passing. The wavefield continues upward to the water's surface, where it is reflected downwards. This reflected, or "ghost," wavefield travels back through the water and by the detector, where its passing is again recorded. Depending upon the nature of the earth material at the water's bottom, the ghost wavefield may, once again, be reflected upwards, giving rise to a series of subsequent ghost reflections. This reverberation of the wavefield obscures the primary data, amplifying certain frequencies and attenuating others, and thereby makes difficult analysis of the underlying earth formations.

Among the art is Ray et al., U.S. Pat. No. 4,353,121. That patent teaches a system in which seismic waves travelling through the water are detected by a slanted cable of spaced-apart hydrophones. After conventional data processing techniques (e.g., demultiplexing, gain recovery, common depth point sorting) have been applied to the wavefield data, static and dynamic time corrections are separately applied to the primary and ghost reflections contained therein. Particularly, the primary reflection wavelets are aligned with one another in one stack, and the ghost reflection wavelets are aligned in another. The ghost reflection data is, additionally, phase-reversed and time-shifted for correspondence with the primary reflection data. The resultant primary stack and ghost stacks are combined to produce a stack which is said to be of improved signal quality.

Also in the art is Ruehle, U.S. Pat. No. 4,486,865, disclosing a technique for reducing ghosting wherein a pressure detector and a particle velocity detector are positioned in close proximity to one another in the water. The output of the detectors to upward and downward travelling waves are gain-adjusted and deconvolved using a filter computed by adding a predetermined amount of white noise to the zero lag of the autocorrelation function. The deconvolved/gain-adjusted output of the detectors are then added to one another to cancel ghost reflections.

Prior techniques of the type described above suffer various drawbacks. For example, the output of the Ray et al system is data-compressed (i.e., stacked) and, therefore, not suited for further processing by traditional pre-stack techniques, i.e., time, amplitude and frequency correction, which might otherwise improve the quality of the seismic reflection analysis. The Ruehle patent, and others like it which utilize filtering techniques, suffers losses in signal quality inherent to the filtering process, for example, amplification of noise in certain frequencies.

In view of the foregoing, an object of this invention is to provide an improved system for marine seismic reflection prospecting. More particularly, an object of the invention is to provide a method and apparatus for marine seismic prospecting having an output with improved signal-to-noise ratios.

A further object of the invention is to provide a marine seismic reflection prospecting system which eliminates ghosting without increasing the noise content of the output signal.

Still another object of the invention is to provide a marine seismic prospecting system that reduces both coherent noise, e.g., ghosting and horizontally travelling noise, and non-coherent noise, e.g., random noise.

A further object of the invention is to provide a marine prospecting system which produces output which may be used in conjunction with other pre-stack techniques, e.g., normal moveout correction, to facilitate analysis of the earth formations under study.

SUMMARY OF THE INVENTION

The above objects are attained by the invention, which provides a marine seismic reflection prospecting system that attenuates coherent noise and reinforces primary seismic reflection data by adding to it corrected ghost reflection data. Enhanced seismic reflection data output by the system is not compressed (i.e., stacked) and, accordingly, is amenable to further pre-stack processing including, for example, normal moveout correction. Because the system does not utilize conventional filter techniques, e.g., deconvolutions, the signal-to-noise of its output is enhanced over all portions of the frequency spectrum. The system, moreover, is capable of reducing coherent noise (e.g., ghosting and horizontally travelling interference), as well as non-coherent noise (e.g., random noise).

In one aspect, a marine seismic reflection prospecting system constructed in accord with the invention includes an energy source, e.g., an air gun, for generating an acoustic wave for reflection from earth strata beneath the water. A detector, e.g., hydrophone-geophone pair, picks up resultant seismic waves including both primaries and ghosts travelling through the water and generates signals representative of them. A wavefield separator coupled to the detector breaks the wavefield down into components propagating in first and second directions, typically, upwardly and downwardly. A time-shift element aligns signals representing the first and second components with one another. Further, a signal enhancement element combines the resultant time-aligned signals in an additive linear combination, preferably, a sum, to form an improved seismic reflection signal suitable for pre-stack analysis.

In another aspect of the invention, a marine seismic reflection prospecting system of the type described above includes a geometric analysis element for determining a time required for the seismic wave to travel between the detector, the water's surface and back again. The time can be derived from external inputs, e.g., depth detectors, or statistically, e.g., through cross-correlation of the detected seismic reflection data. The two-way travel time is used to determine the degree of shifting required to align the first and second directional components of the wavefield.

In still another aspect, the invention contemplates a marine seismic reflection prospecting system of the type described above in which seismic waves travelling in the water are detected by pressure sensor-particle velocity sensor pairs, e.g., hydrophone-geophone pairs. While, in another aspect, the invention contemplates a system where the seismic waves are detected by vertically-spaced pressure sensors.

In other aspects, the invention provides methods for obtaining enhanced seismic reflection data paralleling those described above. These and other aspects of the invention are evident in the drawings and in the description which follows.

BRIEF DESCRIPTION OF THE DRAWINGS

A fuller appreciation of the invention may be attained by reference to the accompanying drawings, in which.

DESCRIPTION OF THE ILLUSTRATED EMBODIMENT

Figure 1:
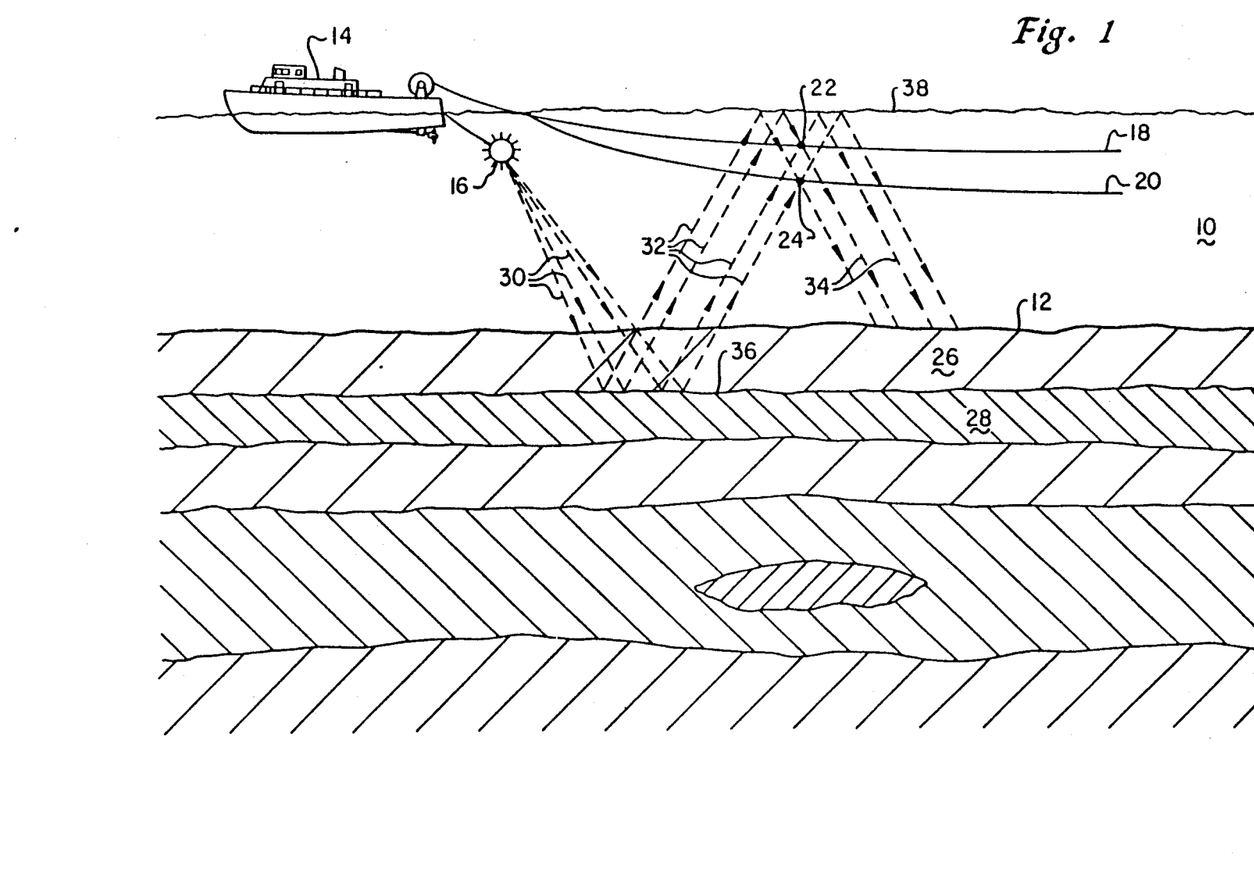
FIG. 1 depicts a dual streamer embodiment of a system constructed in accord with the invention.

FIG. 1 depicts a marine seismic prospecting system constructed according to the invention utilized in a dual streamer operation. In the illustration, a marine craft 14 tows a seismic source 16 and streamers 18, 20 of seismic detectors through a body of water 10, e.g., a lake or ocean, overlying a portion of the earth surface 12 to be studied. The source 16 is preferably an acoustic energy source, e.g., an explosive device or compressed air gun, constructed and operated in a manner conventional to the art.

Illustrated streamers 18 and 20 include hydrophones, 22 and 24, respectively, for detecting water pressure and for generating signals representative thereof. The steamers 18, 20 and their accompanying detectors 22, 24 are also constructed and operated in a manner conventional to the art. In this regard, it will be appreciated, for example, that whereas only two detectors 22, 24 are shown, in practice each streamer could include a plurality of such detectors.

During data collection, seismic waves generated by seismic source 16 travel downward, as indicated by rays 30 and are reflected off earth strata 26, 28 or, more particularly, off the interface 36 between those strata. The upwardly reflected waves 32 travel past the area occupied by the streamers 18, 20 to the water's surface 38. During their first, or primary, passing the waves 32 are detected by upper and lower detectors 22, 24, which generate electrical signals representative of the wavefield and transmit those signals back to the vessel 14 for recording and processing.

Upon striking the water/air interface 38, most of the energy in the wavefield 32 is reflected back toward the water bottom 12, as indicated by rays 34, resulting in a second, downwardly travelling set of reflection data, or ghosts. These ghost reflections once again pass through the area occupied by the streamers 18 and 20, causing the detectors 22, 24 to generate a further set of electrical signals. Depending upon the nature of the earth material at the water's bottom 12, a significant portion of the energy in the ghost reflections striking the water's bottom may once again be reflected back upward, creating a further ghost wavefield (not shown).

Because the ghosts 34 of primary reflections generated by earlier seismic events (e.g., reflections from higher or faster strata 26, 28) tend to overlap, or interfere with, the primaries generated by later events, raw marine seismic data is difficult to interpret.

Whereas prior art schemes, such as those disclosed in the Ruehle patent, have focused on the use of filtering schemes to eliminate ghost reflection data, the inventors named herein have discovered that primary reflection data for use in pre-stack processing can be enhanced by the *addition* of the ghost data. An understanding of this phenomena begins with reference to FIG. 2, which depicts the travel path of the primary and ghost wavefields prior to their impinging on a marine seismic detector 38 positioned on the water bottom 12 (FIG. 1). As will be readily appreciated, the illustrated arrangement is typical of a marine bottom cable operation, where a cable of such detectors are generally placed on the water's bottom 12 (e.g., to minimize the effect of surface noise) during pulsing of the energy source 16 (FIG. 1). Unlike sensors 22, 24 (FIG. 1), sensor 38 comprises both a pressure sensor and a particle velocity sensor disposed substantially adjacent one another for simultaneously detecting, in a manner conventional in the art, the presence of the pressure and particle velocity components of passing wavefields.

Figure 2:
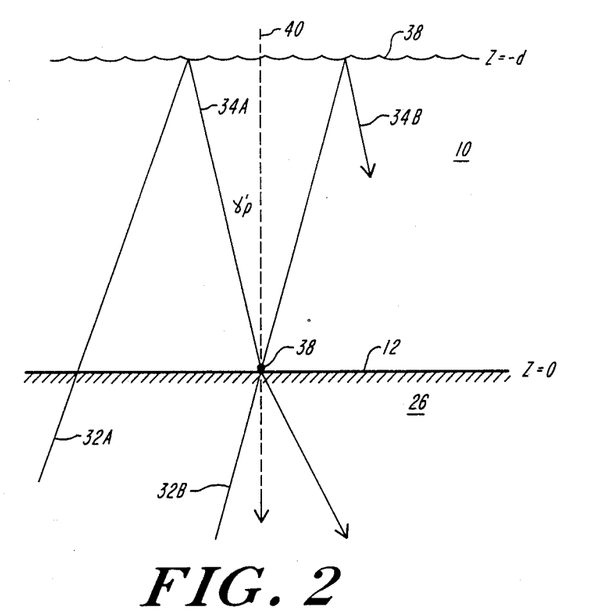
FIG. 2 depicts a travel path Of primary and ghost wavefields prior to their impinging on a bottom-cable marine seismic detector.

In FIG. 2, two primary wavefields 32A, 32B, depicted as upwardly travelling rays, emanate from the earth strata 26 into the water. Ghost wavefields generated upon reflection of these primaries off the water's surface 38 are shown as downwardly directed rays 34A, 34B. Primary waves 32A, 32B and ghost waves 34A, 34B travel in directions $\gamma_p'$ off vertical, as illustrated. For most deep reflectors, of course, $\gamma_p'$ is substantially equal to zero.

As evident upon study of the illustration, information in wavefield 32A takes more time to reach the sensor 38 than that in wavefield 32B. That is, whereas wavefield 32B reaches the sensor at a first instance of time, designated "$t_0$" at the information in wavefield 32A does not reach the sensor until its ghost 34A travels back down to the sensor, a time $2d\cos(\gamma_p')/\alpha'$ later. Here, $\alpha'$ represents the speed of propagation of a p-wave in the water 10, and d represents the depth of the water.

Presuming that wavefields 32A and 32B are reflections off a common sub-bottom interface 36 and, therefore, carry identical information, the prior art practice of canceling ghosts 34A and 34B would result in the loss of valuable data. The present invention, instead, makes use of that data by time-shifting the ghosts and adding information contained in them to that provided by the primaries.

Figure 3A:
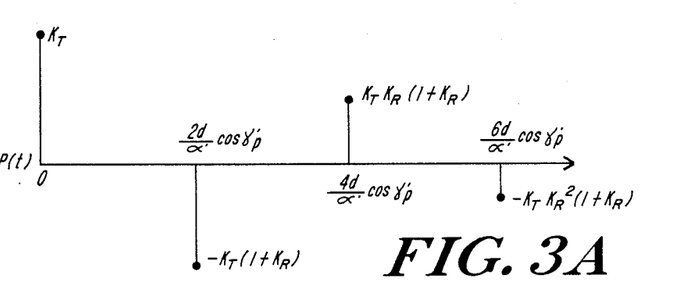
FIGS. 3A and 3B depict the timing and amplitude of primary and ghost reflection data at a bottom-cable marine seismic detector of the type depicted in FIG. 2.
Figure 3B:
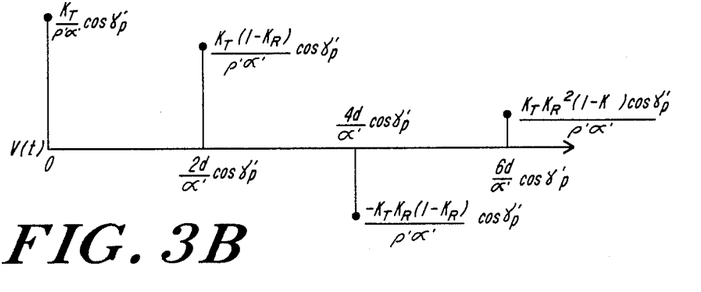

The timing of the arrival of primary and ghost reflection wavefields on the bottom-cable sensor 38 is depicted in greater detail in FIGS. 3A and 3B. Specifically, FIG. 3A depicts the output of a pressure detector within sensor 38 upon coincident arrival of overlapping primary and ghost reflections. FIG. 3B similarly depicts the output of a particle velocity detector within that sensor at the same time.

Referring to FIG. 3A, at a first time, denoted "0" for convenience, the amplitude of a pressure wave p(t) striking the sensor 38 is $K_T$. Shortly thereafter, at a time associated with the travel of a wavefield from the sensor, to the water surface and back again, i.e., at a time $2d\cos(\gamma_p')/\alpha'$ later, the amplitude of the pressure is $-K_T(1+K_R)$; where $K_R$ represents the reflection coefficient of the water bottom. At interval $4d\cos(\gamma_p')/\alpha'$, the pressure is $K_T K_R(1+K_R)$, and at $6d\cos(\gamma_p')/\alpha'$, the pressure is $-K_T K_R^2(1+K_R)$. Further pressure values effected by continued reverberation of the wavefield are not shown.

In tabular form, values of the above-described pressure wave p(t) appear as follows:

| Time | p(t) |
| --- | --- |
| 0 | $+K_T$ |
| $2d\cos(\gamma_p')/\alpha'$ | $-K_T(1 + K_R)$ |
| $4d\cos(\gamma_p')/\alpha'$ | $+K_T K_R(1 + K_R)$ |
| $6d\cos(\gamma_p')/\alpha'$ | $-K_T K_R^2(1 + K_R)$ |

With reference to FIG. 3B, it is likewise seen that at time 0, the amplitude of the particle velocity wave v(t) striking sensor 38 is $K_T\cos(\gamma_p')/(\rho'\alpha')$; where $\rho'$ represents the density of the water 10 through which the wavefield travels. The particle velocity function attains further amplitudes shown in FIG. 3B and presented in the table below.

| Time | v(t) |
| --- | --- |
| 0 | $+K_T\cos(\gamma_p')/(\rho'\alpha')$ |
| $2d\cos(\gamma_p')/\alpha'$ | $+K_T(1 - K_R)\cos(\gamma_p')/(\rho'\alpha')$ |
| $4d\cos(\gamma_p')/\alpha'$ | $-K_T K_R(1 - K_R)\cos(\gamma_p')/(\rho'\alpha')$ |
| $6d\cos(\gamma_p')/\alpha'$ | $+K_T K_R^2(1 - K_R)\cos(\gamma_p')/(\rho'\alpha')$ |

Figure 4:
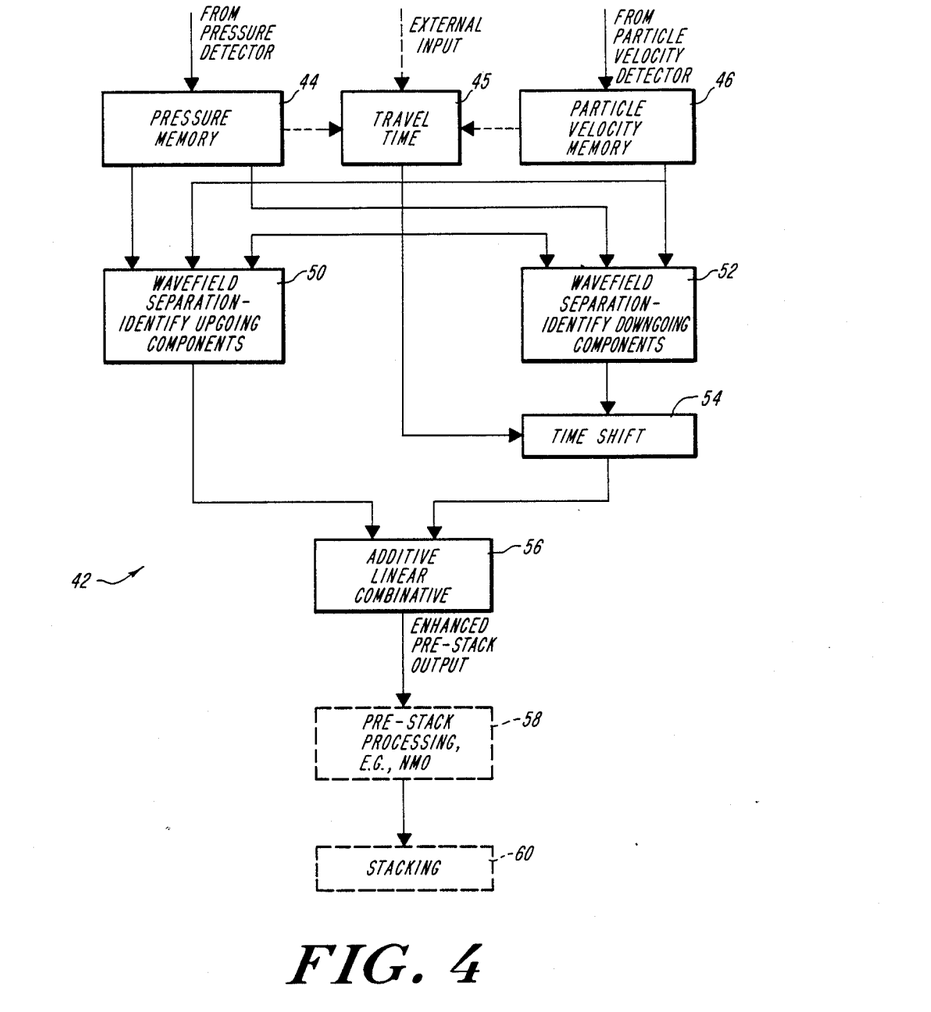
FIG. 4 depicts a preferred configuration of a marine seismic reflection prospecting system constructed and operated in accord with the invention.

An apparatus constructed in accord with the invention for processing pressure and particle velocity functions detected by sensor 38 to produce enhanced prestack seismic reflection data is shown in FIG. 4.

Illustrated apparatus 42 includes memory elements 44 and 46 for recording the respective outputs of the pressure and particle velocity detectors of seismic sensor 38 (FIG. 3). These elements 44, 46 may comprise components of a general digital data processing system or, alternatively, may represent storage registers in a special purpose hardware constructed for practice of the invention.

Apparatus 42 includes element 48 for determining the two-way travel time of ghost reflections in the water 10 (FIG. 1). As noted above, those reflections reverberate with a period of $2d\cos(\gamma_p')/\alpha'$. The travel time element 48 can determine the reverberation period through factoring external inputs representative of the height of the water column, the angle of incidence from vertical of the wavefield, the density of the water, and the p-wave velocity in the water $\alpha'$. Alternatively, the element 48 calculates the wavefield travel time statistically, for example, through maximizing the cross-correlation of the pressure and particle velocity data recorded by the sensor 38.

The output of the memories 44, 46 and the travel time element 48 are routed to wavefield separation elements 50 and 52. Element 50 identifies, within the wavefield detected by sensor 38, the upwardly travelling components, i.e., the primary reflection data. Particularly, the separator 50 multiplies the pressure function p(t), received from memory 44, by a scale factor $k_1$ and adds it to the particle velocity function v(t), received from memory 46. The scale factor $k_1$ can be expressed as $$k_1 = (1 - K_R)\cos(\gamma_p')/(1 + K_R)\rho'\alpha'$$

The output of the separation element 50, representing the upward travelling component of the wavefield, is depicted graphically in FIG. 4A and presented in chart form below.

| Time | $k_1 p(t) + v(t)$ |
| --- | --- |
| 0 | $(K_T\cos(\gamma_p')/(\rho'\alpha'))((1 - K_R)/(1 + K_R) + 1)$ |
| $2d\cos(\gamma_p')/\alpha'$ | 0 |
| $4d\cos(\gamma_p')/\alpha'$ | 0 |
| $6d\cos(\gamma_p')/\alpha'$ | 0 |

Similarly, element 52 identifies within the wavefield detected by sensor 38 the downwardly travelling components, i.e., the ghost reflections. The separator 52 multiplies the pressure function p(t), received from memory 44, by a scale factor $k_2$ and subtracts it from the particle velocity function v(t), received from memory 46. The scale factor $k_2$ may be expressed as $$k_2 = \cos(\gamma_p')/\rho'\alpha'$$

The output of the downgoing component separation element 52 is depicted graphically in FIG. 4B and presented in chart form below.

| Time | $v(t) - k_2 p(t)$ |
| --- | --- |
| 0 | 0 |
| $2d\cos(\gamma_p')/\alpha'$ | $(2K_T\cos(\gamma_p'))/(\rho'\alpha')$ |
| $4d\cos(\gamma_p')/\alpha'$ | $(2K_T K_R\cos(\gamma_p'))/(\rho'\alpha')$ |
| $6d\cos(\gamma_p')/\alpha'$ | $(2K_T K_R^2\cos(\gamma_p'))/(\rho'\alpha')$ |

Those skilled in the art will appreciate that an arrangement similar to that depicted by elements 50 and 52 can be used to separate wavefield components detected not only by a bottom cable sensors, but also by other marine sensors that utilize adjacent pressure/particle velocity detector pairs.

Moreover, alternate techniques for obtaining wavefield separations of marine seismic reflection data—i.e., for generating signals representative of components of a detected wavefield travelling in first and second directions, e.g., upwardly and downwardly—may be substituted for illustrated elements 50 and 52. In this regard, a preferred technique for conducting a wavefield separation using vertically spaced streamers is disclosed in copending, commonly assigned U.S. patent application Ser. No. 07/358,887, filed May 30, 1989, the teachings of which are incorporated herein by reference and a copy of which is filed herewith as Appendix A. A technique for wavefield separation is particularly disclosed, for example, on pp. 9–15 of the Appendix.

To digress, a hydrophone of the type used in illustrated sensor 38 registers a scaler value representing pressure. Ambient pressure is conventionally recorded as zero, with increases in pressure registering as negative numbers and rarefications as positive numbers. When an upgoing wavefield, e.g., 32A, passes such a hydrophone it perceives an increase in pressure and, accordingly, registers a commensurate negative value. The wavefield continues to travel to the ocean surface 38, which is nearly a perfect reflector having a reflection coefficient of −1, and is returned as a rarefaction, e.g., 34A. When that rarefaction passes the hydrophone it registers as a positive number.

A geophone of the type used in the illustrated sensor 38 registers a vector value representing velocity of surrounding particles and their direction. Therefore, an upgoing pressure wave, e.g., 32A, stimulates particle motion which moves the geophone detector up and is recorded as a negative waveform. When the rarefaction pressure wave, e.g., 34A, returns from the surface the direction is now opposite and again the detector moves upward and again a negative waveform is recorded.

If the amplitudes of the ghosts or downgoing waves are normalized to each other, it can be seen that the downgoing ghost reflection will be canceled if the outputs of the two detectors are added. Such an action is effected by element 50.

By the same token if the outputs of the primary or upgoing signal are normalized and the hydrophone data is subtracted from the geophone data, the primary data will cancel and all remaining data will be downgoing or ghost. Here, that action is effected by element 52.

Wavefield separation techniques applicable to a dual streamer operation are discussed in copending, commonly assigned application Ser. No. 07/358,887.

With continued reference to FIG. 4, illustrated apparatus 42 includes an element 54 for time-shifting the downward components of the wavefield to align them with the upward components. More particularly, element 54 time-shifts signals generated by element 52, representative of the downward component of the wavefield detected by sensor 38, an amount equal to the two-way travel time of the wavefield between the sensor, the water's surface and back again, e.g., 2 $d\cos(\gamma_p')/(\rho'\alpha')$. Of course, it will be appreciated that the signals representing the upgoing components can be time-shifted forward in place of the illustrated backward shifting of the downgoing components.

An enhanced pre-stack seismic reflection signal is produced by illustrated element 56. Specifically, that element receives as inputs signals representing the upgoing and time-shifted downgoing component generated, respectively, by elements 50 and 52. The element 56 then linearly additively combines those signals, preferably summing them, to provide an output signal representing an enhanced pre-stack signal.

Figure 5A:
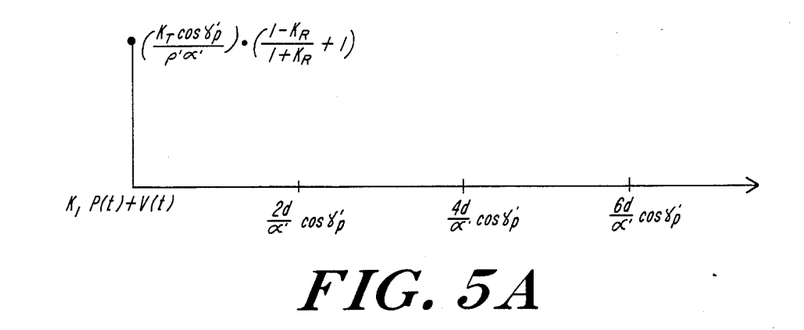
FIGS. 5A-5C depict the processing of pressure-representative and particle velocity-representative signals by the system depicted in FIG. 4.
Figure 5B:
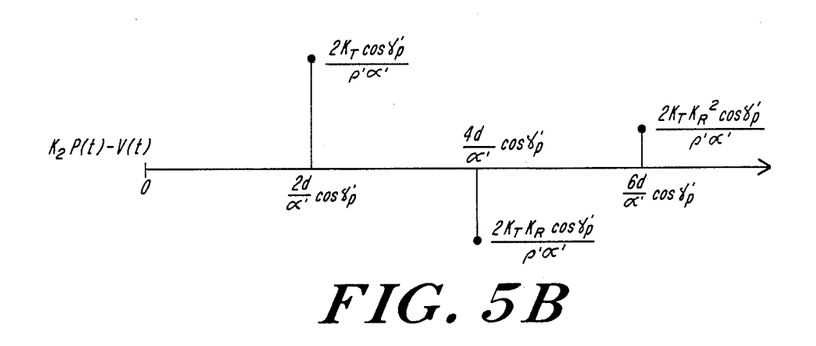
Figure 5C:
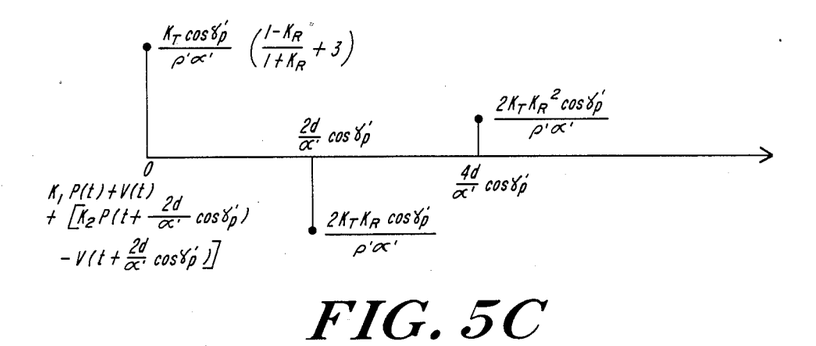

The output of element 56 is depicted graphically in FIG. 5C. As shown there, the output has its strongest component at time 0. The amplitude of that output, representing primary reflection data is $$(K_T\cos(\gamma_p')/(\rho'\alpha'))\cdot(((1-K_R)/(1+K_R))+3)$$

The amplitude of the output of element 56 at later times is significantly smaller. To wit, at time $2d\cos(\gamma_p')/\alpha'$, the signal has an amplitude $2K_TK_R\cos(\gamma_p')/(\rho'\alpha')$; while at time $4d\cos(\gamma_p')/\alpha'$, the signal has an amplitude of $2K_TK_R^2\cos(\gamma_p')/(\rho'\alpha)$. These later values represent remnant of the ghost reflection data.

While illustrated elements 48, 50, 52, 54, and 56 can be constructed using special purpose hardware, they are preferably implemented in a general purpose digital data processing system utilizing software tools of the type available in seismic data processing packages. One such package is commercially available from the assignee hereof under the mark "TIPEX."

Figure 6A:
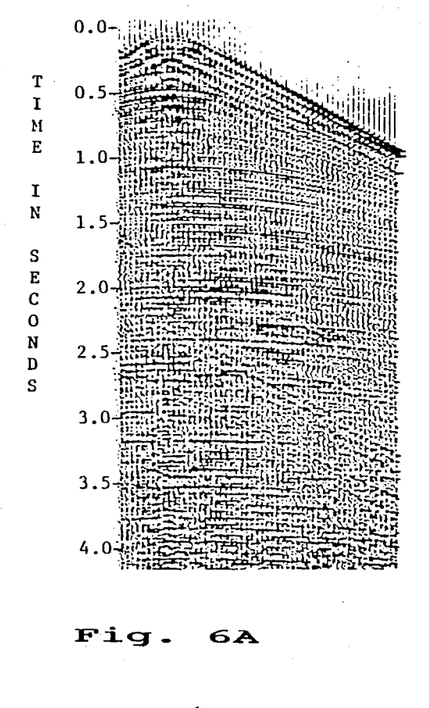
FIGS. 6A-6E are exemplary scans showing the effects of progressive stages of signal processing in a marine seismic reflection prospecting system constructed in accord with the invention.
Figure 6B:
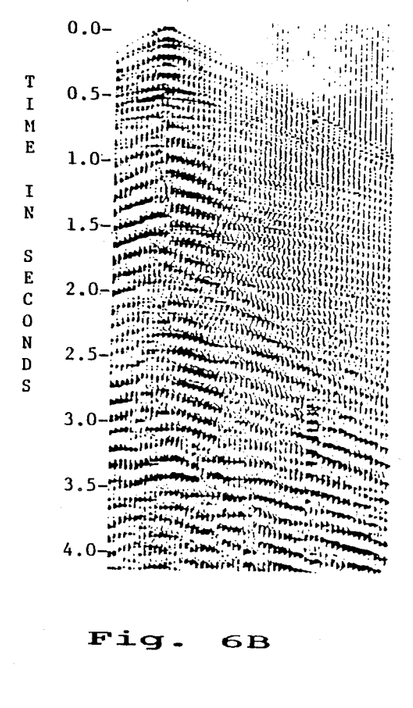
Figure 6C:
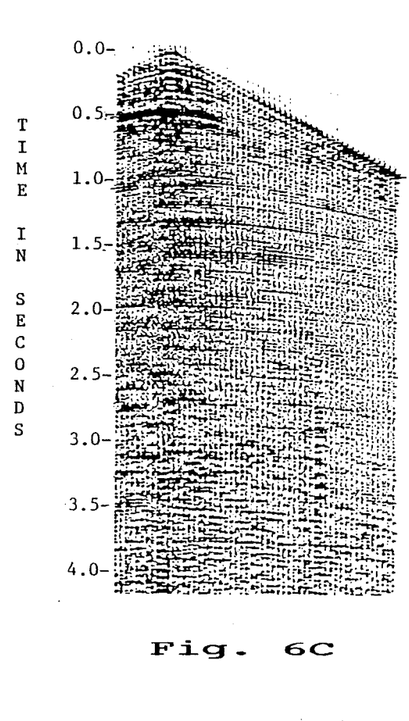
Figure 6D:
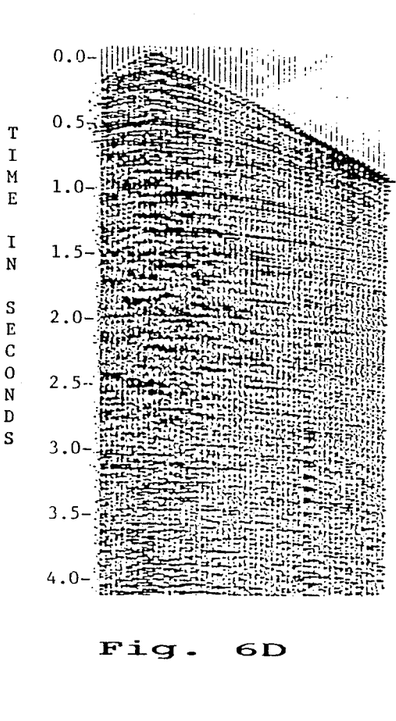
Figure 6E:
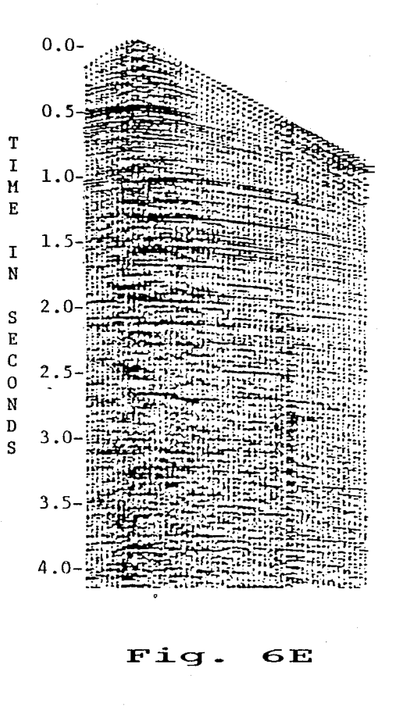

A further appreciation of the operation of illustrated apparatus 42 may be attained by reference to FIGS. 6A–6E, depicting successive stages of Processing of marine seismic reflection data by a Preferred apparatus constructed in accord with the invention. Attached FIGS. 6A and 6B respectively depict the pressure detector and particle velocity detector outputs a bottom-cable sensor positioned in 150′ water. Processing performed on those outputs by the wavefield separation elements 50 and 52 is revealed by FIGS. 6C and 6D, the former showing upgoing components of the wavefield and the latter showing downgoing components. FIG. 6E reveals the effects of timeshifting and summing the upgoing and downgoing wavefields in the manner described above.

As a result of the processing sequence described above, the output of element 56 (as revealed by way of example in FIG. 6E) represents enhanced seismic reflection data having a greater signal-to-noise ratio than conventional prior art techniques. In addition to favorably utilizing ghost reflections to improve signal quality, the apparatus reduces non-coherent noise, e.g., random noise, and coherent noise, e.g., noise travelling horizontally through the water. The output of the apparatus, moreover, is suitable to be passed on for pre-stack processing, e.g., normal moveout analysis and, later, for stacking, as indicated by exemplary pre-stack processing elements 58 and 60.

Those skilled in the art will appreciate that a marine seismic reflection prospecting system as described hereinabove does not utilize a filtering mechanism for changing the frequency output of pressure and/or velocity detectors of the type disclosed in the Ruehle patent, U.S. Pat. No. 4,486,865. More particularly, it will be appreciated that the system described hereinabove does not include a filter element including a minimum phase deconvolution operator having a predetermined amount of white noise added to the zero lag of the autocorrelation.

It will be further appreciated that the embodiments described above are exemplary only and that other embodiments falling within the scope of the invention are contemplated herein. For example, it will be appreciated that the invention contemplates the processing of data in the time domain, as discussed above, as well as in the angle of emergence domain, as discussed in Treitel, et al, "Plane-wave Decomposition of Seismograms," *Geophysics*, Vol. 47, No. 10 (Oct. 1982), pp. 1375–1401, the teachings of which are incorporated herein by reference, and in other domains substitutable therewith.

Further, whereas the illustrated embodiments related to marine dual-streamer and bottom cable operations, the invention is equally applicable to land-based VSP operations, as well as other seismic reflection detection processes conducted in fluid media in which upgoing and downgoing wavefields can be separated.

By way of further example, the invention contemplates aligning the components of the upwardly and downwardly travelling wavefield components using other methods than those discussed, e.g., by like time-warping. Embodiments incorporating these and other modifications within the ken of those skilled in the art are, thereby, contemplated to fall within the scope of the invention.

Accordingly, what we claim is:

1. An improved system for generating pre-stack seismic reflection data for use in geophysical prospecting of water covered areas, comprising
   A. energy source means for generating a seismic wave for reflection from earth strata,
   B B. detection means for detecting a resultant seismic wave and for generating a signal representative thereof,
   C. wavefield separation means coupled to said detection means and responsive to said resultant seismic wave-representative signal for generating
      (i) a first signal component representative of propagation of said seismic wave in a first direction through said water,
      (ii) a second signal component representative of propagation of said seismic wave in a second direction through said water,
   D. time-shift means coupled with said wavefield separation means for time-shifting said first and second signal components relative one another and for generating, respectively, first and second time-aligned signals representative thereof, and
   E. signal enhancement means coupled to said wavefield separation means for generating an enhanced pre-stack seismic wave signal representative of an additive linear combination of said first and second time-aligned signals, thus attenuating coherent noise in said resultant seismic wave-representative signal.

2. A system according to claim 1, wherein said time-shift means comprises
   A. geometric analysis means for generating a signal representative of a time associated with travel of said resultant seismic wave between said detection means and a surface of said water, and
   B. means for time-shifting said first and second signal components relative to one another as a function of said travel-associated signal.

3. A system according to claim 1, wherein said time-shift means includes
   A. cross correlation means for generating a signal representative of a cross correlation of said first and second signal components, and
   B. means for time-shifting said first and second signal components relative to one another as a function of a selected maximization of said crosscorrelation-representative signal.

4. A system according to claim 3, wherein said detection means comprises a plurality of vertically-spaced seismic detectors.

5. A system according to claim 3, wherein said detection means comprises

A. pressure detector means for detecting a pressure wave associated with propagation of said resultant seismic wave through said water and for generating a signal representative thereof, and
B. velocity detector means for detecting a particle velocity of said water associated with propagation of said resultant seismic wave therethrough and for generating a signal representative thereof, said velocity detector means being positioned in close proximity to said pressure detector.

6. A system according to claim 3, wherein said wavefield separation means includes
   A. means for generating said first signal component to be representative of substantially upward propagation of said seismic wave through said water, and
   B. means for generating said second signal component to be representative of substantially downward propagation of said resultant seismic wave through said water.

7. A system according to claim 3 wherein said signal enhancement means includes means for deriving said enhanced pre-stack seismic wave signal in the angle of emergence domain.

8. An improved system for generating pre-stack seismic reflection data for use in geophysical prospecting of water covered areas, comprising
   A. energy source means for generating a seismic wave for reflection from earth strata,
   B. detection means for detecting a resultant seismic wave and for generating a signal representative thereof,
   C. wavefield separation means coupled to said detection means and responsive to said resultant seismic wave-representative signal for generating
      (i) a first signal component representative of propagation of said resultant seismic wave in a first direction through said water,
      (ii) a second signal component representative of propagation of said resultant seismic wave in a second direction through said water,
   D. time-shift means coupled with said wavefield separation means for time-shifting said first and second signal components relative one another and for generating, respectively, first and second time-aligned signals representative thereof, said time-shift means including
      (i) geometric analysis means for generating a signal representative of a time associated with travel of said resultant seismic wave between said detection means and a surface of said water,
      (ii) means coupled with said geometric analysis means for time-shifting said first and second signal components relative to one another as a function of said travel-associated signal; and
   E. signal enhancement means coupled to said wavefield separation means for generating an enhanced pre-stack seismic wave signal representative of an additive linear combination of said first and second time-aligned signals, thus attenuating coherent noise in said detected resultant seismic wave representative signal.

9. An improved method for generating pre-stack seismic reflection data for use in geophysical prospecting of water covered areas, comprising
   A. generating a seismic wave for reflection from earth strata beneath said water, B. detecting a resultant seismic wave travelling through said water and for generating a signal representative thereof, C. separating said resultant seismic wave into
  (i) a first signal component representative of propagation of said seismic wave in a first direction through said water,
  (ii) a second signal component representative of propagation of said seismic wave in a second direction through said water, D. time-shifting said first and second signal components relative one another and for generating, respectively, first and second time-aligned signals representative thereof, and E. additively linearly combining said first and second time-aligned signals to generate an enhanced pre-stack seismic wave signal and, thus, attenuating coherent noise in said resultant seismic wave-representative signal.

10. A method according to claim 9, wherein said time-shifting step comprise the steps of
  A. generating a signal representative of a time associated with travel of said resultant seismic wave between said detection means and a surface of said water, and
  B. time-shifting said first and second signal components relative to one another as a function of said travel path-associated signal.

11. A method according to claim 9, wherein said time-shifting step comprises the steps of
  A. generating a signal representative of a crosscorrelation of said first and second signal components, and
  B. time-shifting said first and second signal components relative to one another as a function of a selected maximization of said crosscorrelation-representative signal.

12. A method according to claim 11, wherein said detecting step comprises the step detecting said resultant seismic wave with a plurality of vertically-spaced seismic detectors.

13. A method according to claim 11, wherein said detecting step comprises the steps of
  A. detecting a pressure wave associated with propagation of said resultant seismic wave through said water and for generating a signal representative thereof, and
  B. detecting a particle velocity of said water associated with propagation of said resultant seismic wave therethrough and for generating a signal representative thereof, said velocity detector means being positioned in close Proximity to said pressure detector.

14. A method according to claim 11, wherein said wavefield separating step includes the steps of
  A. generating said first signal component to be representative of substantially upward propagation of said seismic wave through said water, and
  B. generating said second signal component to be representative of substantially downward propagation of said resultant seismic wave through said water.

15. A method according to claim 11 wherein said enhanced pre-stack seismic signal generating step includes the step of deriving said enhanced pre-stack seismic wave signal in the angle of emergence domain.

16. An improved method for generating pre-stack seismic reflection data for use in geophysical prospecting of water covered areas, comprising the steps of
  A. generating a seismic wave for reflection from earth strata,
  B. detecting a resultant seismic wave and for generating a signal representative thereof,
  C. separating said resultant seismic wave into
    (i) a first signal component representative of Propagation of said resultant seismic wave in a first direction through said water,
    (ii) a second signal component representative of propagation of said resultant seismic wave in a second direction through said water,
    and generating signals representative thereof,
  D. time-shifting said first and second signal component relative one another and for generating, respectively, first and second time-aligned signals representative thereof, said time-shifting step including the steps of
    (i) generating a signal representative of time associated with travel of said seismic wave between said detection means and a surface of said water,
    (ii) time-shifting said first and second signal components relative to one another as a function of said travel-associated signal; and
  E. additively linearly combining said first and second time-aligned signals to generate an enhanced pre-stack seismic wave signal and, thus, to attenuate coherent noise in said detected resultant seismic signal.

17. An improved system for generating pre-stack seismic reflection data for use in geophysical prospecting of water covered areas,
  said system being free of filter means including a deconvolution operation for changing the frequency content of any one of pressure-detecting and velocity-detecting elements,
  said system comprising
  A. energy source means for generating a seismic wave for reflection from earth strata,
  B. detection means for detecting a resultant seismic wave and for generating a signal representative thereof,
  C. wavefield separation means coupled to said detection means and responsive to said resultant seismic wave-representative signal for generating
    (i) a first signal component representative of propagation of said seismic wave in a first direction through said water,
    (ii) a second signal component representative of propagation of said seismic wave in a second direction through said water,
  D. time-shift means coupled with said wavefield separation means for time-shifting said first and second signal components relative one another and for generating, respectively, first and second time-aligned signals representative thereof, and
  E. signal enhancement means coupled to said wavefield separation means for generating an enhanced pre-stack seismic wave signal representative of an additive linear combination of said first and second time-aligned signals, thus attenuating coherent noise in said resultant seismic wave-representative signal.

18. An improved system for generating pre-stack seismic reflection data for use in geophysical prospecting of water covered areas, said system being free of filter means including a deconvolution operation having a predetermined amount of white noise added to the zero lag of the autocorrelation for changing the frequency content of any one of pressure-detecting and velocity-detecting elements, said system comprising A. energy source means for generating a seismic wave for reflection from earth strata, B. detection means for detecting a resultant seismic wave and for generating a signal representative thereof, C. wavefield separation means coupled to said detection means and responsive to said resultant seismic wave-representative signal for generating
  (i) a first signal component representative of propagation of said resultant seismic wave in a first direction through said water,
  (ii) a second signal component representative of propagation of said resultant seismic wave in a second direction through said water, D. time-shift means coupled with said wavefield separation means for time-shifting said first and second signal components relative one another and for generating, respectively, first and second time-aligned signals representative thereof, said time-shift means including
  (i) geometric analysis means for generating a signal representative of a time associated with travel of said resultant seismic wave between said detection means and a surface of said water,
  (ii) means coupled with said geometric analysis means for time-shifting said first and second signal components relative to one another as a function of said travel-associated signal; and E. signal enhancement means coupled to said wavefield separation means for generating an enhanced pre-stack seismic wave signal representative of an additive linear combination of said first and second time-aligned signals, thus attenuating coherent noise in said detected resultant seismic wave representative signal.

19. An improved method for generating pre-stack seismic reflection data for use in geophysical prospecting of water covered areas, said method being free of filter means including a deconvolution operation for changing the frequency content of any one of pressure-detecting and velocity-detecting elements, said method comprising the steps of A. generating a seismic wave for reflection from earth strata beneath said water, B. detecting a resultant seismic wave travelling through said water and for generating a signal representative thereof, C. separating said resultant seismic wave into
  (i) a first signal component representative of propagation of said seismic wave in a first direction through said water,
  (ii) a second signal component representative of propagation of said seismic wave in a second direction through said water, D. time-shifting said first and second signal components relative one another and for generating, respectively, first and second time-aligned signals representative thereof, and E. additively linearly combining said first and second time-aligned signals to generate an enhanced pre-stack seismic wave signal and, thus, attenuating coherent noise in said resultant seismic wave-representative signal.

20. An improved method for generating pre-stack seismic reflection data for use in geophysical prospecting of water covered areas, said method being free of filter means including a deconvolution operation having a predetermined amount of white noise added to the zero lag of the autocorrelation for changing the frequency content of any one of pressure-detecting and velocity-detecting elements, said method comprising the steps of A. generating a seismic wave for reflection from earth strata, B. detecting a resultant seismic wave and for generating a signal representative thereof, C. separating said resultant seismic wave into
  (i) a first signal component representative of propagation of said resultant seismic wave in a first direction through said water,
  (ii) a second signal component representative of propagation of said resultant seismic wave in a second direction through said water,
  and generating signals representative thereof, D. time-shifting said first and second signal component relative one another and for generating, respectively, first and second time-aligned signals representative thereof, said time-shifting step including the steps of
  (i) generating a signal representative of time associated with travel of said seismic wave between said detection means and a surface of said water,
  (ii) time-shifting said first and second signal components relative to one another as a function of said travel-associated signal; and E. additively linearly combining said first and second time-aligned signals to generate an enhanced pre-stack seismic wave signal and, thus, to attenuate coherent noise in said detected resultant seismic signal.

* * * * *

UNITED STATES PATENT AND TRADEMARK OFFICE
CERTIFICATE OF CORRECTION

PATENT NO. : 4,935,903

DATED : June 19, 1990

INVENTOR(S) : Joe Sanders et al

It is certified that error appears in the above-identified patent and that said Letters Patent is hereby corrected as shown below:

In column 3, line 35, delete [Of] and insert therefore -- of --.

In column 4, line 67, delete [at].

In column 5, line 40, delete [$-K_T K_R 2 (1 + K_R)$] and insert therefore -- $-K_T K^2_R (1 + K_R)$ --.

In column 8, line 22, delete [Preferred] and insert therefore -- preferred --.

In column 8, line 21, delete [Processing] and insert therefore -- processing --.

In column 9, line 21, delete [BB.] and insert therefore -- B. --.

In column 9, line 57, delete [cross correlation] and insert therefore -- crosscorrelation --.

In column 9, line 58, delete [cross correlation] and insert therefore --crosscorrelation --.

In column 11, line 54, delete [Proximity] and insert therefore -- proximity --.

UNITED STATES PATENT AND TRADEMARK OFFICE
CERTIFICATE OF CORRECTION

PATENT NO. : 4,935,903

DATED : June 19, 1990

INVENTOR(S) : Joe Sanders, et al

It is certified that error appears in the above-identified patent and that said Letters Patent is hereby corrected as shown below:

In column 12, line 9, delete [Propagation] and insert therefore

--propagation--.

Signed and Sealed this

Fourteenth Day of January, 1992

Attest:

HARRY F. MANBECK, JR.

*Attesting Officer*   *Commissioner of Patents and Trademarks*